United States Patent
Piccolo et al.

(10) Patent No.: US 8,092,747 B2
(45) Date of Patent: Jan. 10, 2012

(54) MODULAR REACTOR FOR EXOTHERMIC/ENDOTHERMIC CHEMICAL REACTIONS

(75) Inventors: Vincenzo Piccolo, Zelo Buon Persico (IT); Susi Bonomi, Albino (IT); Marzio Piazza, Concorezzo (IT)

(73) Assignees: ENI S.p.A., Rome (IT); Institut Français du Pétrole, Rueil Malmaison (FR)

( * ) Notice: Subject to any disclaimer, the term of this patent is extended or adjusted under 35 U.S.C. 154(b) by 298 days.

(21) Appl. No.: 12/520,002

(22) PCT Filed: Dec. 18, 2007

(86) PCT No.: PCT/EP2007/011212
§ 371 (c)(1), (2), (4) Date: Jun. 18, 2009

(87) PCT Pub. No.: WO2008/074496
PCT Pub. Date: Jun. 26, 2008

(65) Prior Publication Data
US 2010/0016455 A1    Jan. 21, 2010
US 2010/0210740 A2    Aug. 19, 2010

(30) Foreign Application Priority Data
Dec. 21, 2006   (IT) .............................. MI2006A2466

(51) Int. Cl.
B01J 8/18   (2006.01)
F27B 15/00  (2006.01)
B01J 19/00  (2006.01)
B01J 8/00   (2006.01)
B01J 8/04   (2006.01)

(52) U.S. Cl. ........ 422/140; 422/129; 422/139; 422/146; 422/198

(58) Field of Classification Search .................. 422/129, 422/139, 140, 600, 630, 626, 646–649, 198
See application file for complete search history.

(56) References Cited

U.S. PATENT DOCUMENTS

| | | |
|---|---|---|
| 2,590,465 A | 3/1952 | Ris |
| 6,132,690 A | 10/2000 | Belmonte et al. |
| 2005/0080147 A1 | 4/2005 | Hawthorne et al. |
| 2007/0053807 A1 | 3/2007 | Boer et al. |

FOREIGN PATENT DOCUMENTS

| | | |
|---|---|---|
| DE | 910 053 | 4/1954 |
| EP | 0 909 581 | 4/1999 |
| WO | 94 16807 | 8/1994 |
| WO | 2005 075065 | 8/2005 |

*Primary Examiner* — Walter D Griffin
*Assistant Examiner* — Natasha Young
(74) *Attorney, Agent, or Firm* — Oblon, Spivak, McClelland, Maier & Neustadt, L.L.P.

(57) ABSTRACT

Modular reactor for exothermic/endothermic chemical reactions which take place in three-phase systems, comprising a series of modules, superimposed with respect to each other, fixed to each other by means of coupling flanges, each module consisting of an external cylindrical body and a series of tube bundles, for the circulation of a thermal-exchange fluid, positioned inside said body.

16 Claims, 4 Drawing Sheets

MODULAR REACTOR FOR EXOTHERMIC/ENDOTHERMIC CHEMICAL REACTIONS

The present invention relates to a modular reactor for exothermic/endothermic chemical reactions.

More specifically, the present invention relates to a modular reactor for exothermic chemical reactions which take place in three-phase systems (known as slurry) wherein a solid phase, in finely subdivided form, dispersed in a continuous liquid phase, is maintained in suspension by a gaseous phase which passes through the same liquid phase, in the form of bubbles.

Even more specifically, the present invention relates to a modular reactor for chemical reactions in suspension which are effected according to the Fischer-Tropsch technology, wherein a solid catalyst in the form of fine particles is kept in suspension in a liquid phase (the reaction product) by a reagent gas, essentially consisting of hydrogen and carbon monoxide fed to the bottom of the reactor, which flows, by reacting with the development of heat, in the form of bubbles through the liquid mass. This type of reactor is known as "Slurry Bubble Column Reactor".

In the present description, all the operative conditions mentioned should be considered as being the preferred conditions, even if not expressly declared.

As is known, the Fischer-Tropsch reaction is a chemical reaction which takes place in three-phase systems wherein a gaseous phase is bubbled into a suspension of a solid in a liquid. The gaseous phase is a mixture of hydrogen and carbon oxide with a $H_2/CO$ molar ratio ranging from 1 to 3, the dispersing liquid phase represents the reaction product, i.e. essentially linear/branched hydrocarbons (paraffin waxes) with a high number of carbon atoms, and the solid phase is represented by the catalyst.

The exothermic nature of Fischer-Tropsch reactions (35-45 kcal/mol) makes it essential to have, in combination with the synthesis reactor and preferably in its interior, of a thermal-exchange device, preferably with tubes, for controlling the temperature within the operative limits of the reaction and preventing the formation of local "hot spots", which are responsible for the deterioration of the catalyst.

However, as the last generation of industrial reactors for the Fischer-Tropsch synthesis, which make use of the "Slurry Bubble Column" technology, have enormous dimensions, for example there can be cylindrical constructions 60 meters high or even more, with a diameter of 10 meters or greater, the running of the reactor, in particular its maintenance, for example the maintenance of the tubes of the thermal-exchange device, can create various problems. The simple substitution of a damaged tube of the thermal-exchange device in a 40-60 meter high reactor, or more, can in fact be a not easily solvable problem.

The Applicants has now found that the solution of the above problem can be to avail of a reactor and thermal-exchange system which are both modular, and the modules can be disassembled and reassembled in relatively short times, when, either for emergencies or periodically, it is necessary to intervene with maintenance operations. In particular, each module includes an outer body, essentially cylindrical, which represents a section of the reactor jacket, and an inner thermal-exchange system, described hereunder, consisting of a series of vertical tubes inside which, in case of the Fischer-Tropsch synthesis, water or another cooling fluid is passed. Any outer cylindrical body and its inner thermal-exchange system, represent a module of the modular reactor object of the present invention.

An object of the present invention therefore relates to a modular reactor for exothermic/endothermic chemical reactions which take place in three-phase systems, wherein a solid phase in finely subdivided form is dispersed in a continuous liquid phase and is maintained in suspension by a gaseous phase which passes through the liquid phase in the form of bubbles, which comprises:

a. a series of substantially cylindrical bodies which can be superimposed;
b. a covering element positioned on the head of the upper body;
c. a closing element positioned at the base of the lower body;
d. a gas distributor, situated in correspondence with the base of the lower body, which substantially rests on the closing element and is connected to means for the feeding of the reagent gas;
e. discharge means of the liquid reaction product, situated in correspondence with one or more of the cylindrical bodies;
f. thermal-exchange devices, inserted in each cylindrical body and comprising a series of thermal-exchange units, each unit consisting of a series of bundles, each bundle consisting of a series of parallel, vertical tubes, connected in series, according to the flow of a heat-exchange fluid, above and below, one after another, by means of U-connectors;
g. at least one distribution collector and at least one collector for the collection of the heat-exchange fluid, which flows in the tubes of the thermal-exchange units, having a tubular form and situated internally, on a horizontal plane, in the upper part or, alternatively, in the lower part of each cylindrical body;
h. at least one pair of openings positioned externally and peripherically around the upper part or, alternatively, the lower part of each cylindrical body, one opening of said pair of openings being connected to the distribution collector and the other to the collection collector of the thermal-exchange fluid.

According to the present invention, the reactor can include a number of cylindrical bodies varying from 2 to 10, even if from 3 to 6 bodies are preferred. Each body, normally made of carbon steel, corrosion-resistant steel or bound with metals selected from those of group 5-10, such as, for example, vanadium, niobium, chromium, molybdenum, tungsten, manganese, nickel, etc., has a height which can vary from 3 to 15 meters and a diameter ranging from 1.5 to 10 m or more, according to the chemical reaction which takes place inside the reactor, the thermodynamic conditions, the reaction yields and flow-rates of the reagents fed. The thickness of the walls of the bodies depend on the temperature and pressure at which the chemical reaction takes place, but generally range from 40 to 200 mm.

The cylindrical bodies are equipped with upper and lower coupling flanges, which allow the same bodies, once stacked, to be blocked to each other by suitable connecting means, in order to allow and facilitate the construction and dismantling of the reactor, object of the present invention, also in relatively short times, for example for effecting ordinary or extraordinary maintenance interventions. Metal gaskets, which interact with each other, guaranteeing to liquid and gas sealing, are used on the upper and lower coupling flanges, in order to avoid leakage of liquid (slurry) or gas at the interface.

A thermal-exchange system is envisaged in the interior of each body, in which a cooling fluid flows, for example water, when the reaction involved is of the exothermic type, or overheated vapour, when the reaction is of the endothermic type. The cylindrical body and the corresponding heat-exchange system present in its interior, represent the module for constructing the modular reactor, object of the present invention.

The thermal-exchange system comprises, for each module, a series of thermal-exchange units, for example 5 to 80 units, preferably 40 to 70, more preferably from 45 to 65.

Each thermal-exchange unit comprises a series of tube bundles, substantially vertical and parallel with each other. The bundles are positioned vertically inside each thermal-exchange unit, in each cylindrical body, so as to occupy a volume ranging from 5 to 25% of the total volume of each body. The specific thermal-exchange surface, of the thermal-exchange units, generally ranges from 4 to 40 $m^2/m^3$ of reagent medium (slurry) present in the cylindrical body, preferably from 5 to 30 $m^2/m^3$, more preferably from 5 to 15 $m^2/m^3$.

Each thermal-exchange unit comprises a number of bundles which varies according to the position inside the cylindrical body. In general, each thermal-exchange unit includes a number of bundles ranging from 1 to 9. In particular, the thermal-exchange units which occupy the central part of the reactor have a number of bundles, generally geometrically identical, ranging from 4 to 9, whereas the more peripheral thermal-exchange units, having a different geometry, have from 1 to 4 bundles.

Each bundle also comprises a varying number of tubes, according to the position occupied inside the cylindrical body. In general, each bundle comprises from 5 to 30 tubes, preferably from 8 to 25. In particular, the bundles situated at the centre inside the cylindrical body have from 10 to 20 tubes, preferably from 12 to 16, the intermediate bundles between the cylindrical body wall and its central part, from 5 to 30, preferably from 8 to 22.

The tubes, having a diameter of 2 to 6 cm, can have varying lengths, the maximum length being substantially equal to that of the cylindrical body, and they are made of materials capable of resisting the possible corrosion of the reagents or the reaction products and capable of favouring thermal-exchange between the fluids involved. The tubes can generally be made of copper, copper alloy or corrosion-resistant steel, for example stainless steel, or carbon steel.

The tubes of each bundle are connected in series, according to the flow of the fluid which passes through them, by means of U-connectors which allow the passage of the cooling/heating fluid through all the tubes of the bundle before leaving the same to enter the respective collection collector and discharge opening.

In order to facilitate the maintenance of the bundle, the U-connectors are connected by means of moveable connection systems, for example through screwing, wedge-insertion flanged elements, etc. or they are simply connected through a welding.

At least one thermal-exchange fluid distribution collector is envisaged inside each of the cylindrical bodies, at the bottom or at the head, for example from 2 to 60, for feeding the thermal-exchange fluid to the tubes of the bundles of one or more thermal-exchange units, and at least one collection collector, for example from 2 to 60, for collecting and conveying the return fluid from the thermal-exchange system (or from the tubes of the bundles belonging to one or more thermal-exchange units) towards the outside. A series of pairs of openings is further envisaged to favour the feeding and discharge operations of the thermal-exchange fluid, said openings being situated outside each cylindrical body, in correspondence with the collection and distribution collectors. One of the openings of each pair transfers the thermal-exchange fluid to the distribution collector, whereas the other conveys the thermal fluid which accumulates in the collection collector, to the outside. The openings can be in a number corresponding to each collector, therefore from 2 to 60 openings for the distribution collectors and from 2 to 60 openings for the collection collectors.

The single bundles (belonging to one or more thermal-exchange units) connected to the corresponding feeding and collection collectors, are distributed on the module section. If a tube brakes, it is possible to intercept the bundles including said broken tube, by closing the respective feeding and discharge openings. In this way, it is possible to isolate the single group of bundles without jeopardizing the thermal-exchange, as the heat removal is, in any case, guaranteed by the adjacent bundles which are connected to different feeding and collection collectors. Furthermore, the thermal-exchange fluid can be fed into the single modules and/or thermal-exchange unit and/or bundles, through the corresponding collectors, with changeable flow-rates according to the local and/or overall thermal requirements.

The modular reactor, object of the present invention, can be used, in particular, for exothermic Fischer-Tropsch chemical reactions, wherein a reagent gaseous phase consisting of a mixture of CO and $H_2$ (synthesis gas) flows through a liquid mass, consisting of paraffin waxes in the liquid state (reaction product), maintaining the reaction catalyst homogeneously distributed in suspension, in the form of finely subdivided particles.

In particular, the reactor for Fischer-Tropsch chemical reactions, is a bubble reactor inside which chemical reactions take place which develop in three-phase systems wherein a gaseous/vapour phase is bubbled into a suspension of a solid in a liquid. In this case, the gaseous/vapour phase essentially consists of the synthesis gas and light reaction products in vapour phase, the dispersing liquid phase is the heavy reaction product, i.e. hydrocarbons essentially with a high number of carbon atoms, and the solid phase is represented by the catalyst.

The synthesis gas preferably comes from steam reforming and/or the partial oxidation of natural gas or other hydrocarbons, on the basis of the reactions described, for example, in U.S. Pat. No. 5,645,613. As an alternative, the synthesis gas can come from other production techniques such as, for example, from "autothermal reforming", C.P.O. (Catalytic Partial Oxidation) or from the gasification of carbon, or other carbonaceous products, with water vapour at a high temperature, as described in "Catalysis Science and Technology" vol. 1, Springer-Verlag, New York, 1981.

Two phases are substantially produced from the Fischer-Tropsch reaction, a lighter phase, in vapour phase, essentially consisting of a light hydrocarbon mix, with a number of carbon atoms ranging from 1 to 25 and a boiling point at atmospheric pressure, for the $C_5$-$C_{25}$ fraction, equal to or lower than about 150° C. and reaction side-products such as water vapour, $CO_2$, ethers or alcohols.

The second phase produced essentially consists of paraffins, liquid at the reaction temperature, comprising mixtures of linear, branched, saturated and unsaturated hydrocarbons with a high number of carbon atoms. These are generally hydrocarbon mixtures with a boiling point, at room pressure, higher than 150° C., for example between 160 and 380° C.

The Fischer-Tropsch reaction is carried out at temperatures equal to or higher than 150° C., for example from 200 to 350° C., maintaining a pressure ranging from 0.5 to 20 MPa, inside the reactor. More significant details on the Fischer-Tropsch reaction can be found in "Catalysis Science and Technology" mentioned above.

The liquid phase contains the catalyst in suspension. The catalyst is generally based on cobalt or iron supported on an inert solid carrier. The catalyst which is preferably suitable for the modular reactor according to the present invention, is based on cobalt, dispersed on a solid carrier consisting of at least one solid selected from one or more of the following elements: Si, Ti, Al, Zr, Mg. Preferred carriers are silica, alumina or titanium dioxide (titania).

Cobalt is present in the catalyst in quantities ranging from 1 to 50% by weight, generally from 5 to 35% with respect to the total weight. Furthermore, the catalyst used can include further additional elements. It can include, for example, from 0.05 to 5% with respect to the total weight, preferably from 0.1 to 3%, of ruthenium and from 0.05 to 5% by weight, preferably from 0.1 to 3% of at least a third element selected from those belonging to Group 3 (IUPAC regulation). Catalysts of this type are known in literature and described, together with their preparation, in European patent 756,895.

Further examples of catalyst are again based on cobalt but containing, as promoter, tantalum in quantities of 0.05-5% by weight with respect to the total, preferably 0.1-3%.

These catalysts are prepared by first depositing a cobalt salt on the inert carrier (silica or alumina), for example by means of the dry impregnation technique, followed by a calcination step and, optionally, a reduction and passivation step of the calcined product.

A tantalum derivative (particularly tantalum alcoholates) is deposited on the catalytic precursor thus obtained, preferably using the wet impregnation technique, followed by calcination and, optionally, reduction and passivation.

The catalyst, whatever its chemical composition may be, is used in the form of finely subdivided powder with an average diameter of the granules ranging from 30 to 250 µm, preferably from 50 to 150 µm.

Reference will be made to the drawings of the enclosed figures which represent an illustrative and non-limiting embodiment, for a better understanding of the modular reactor, object of the present invention. In particular:

Figure 3A:
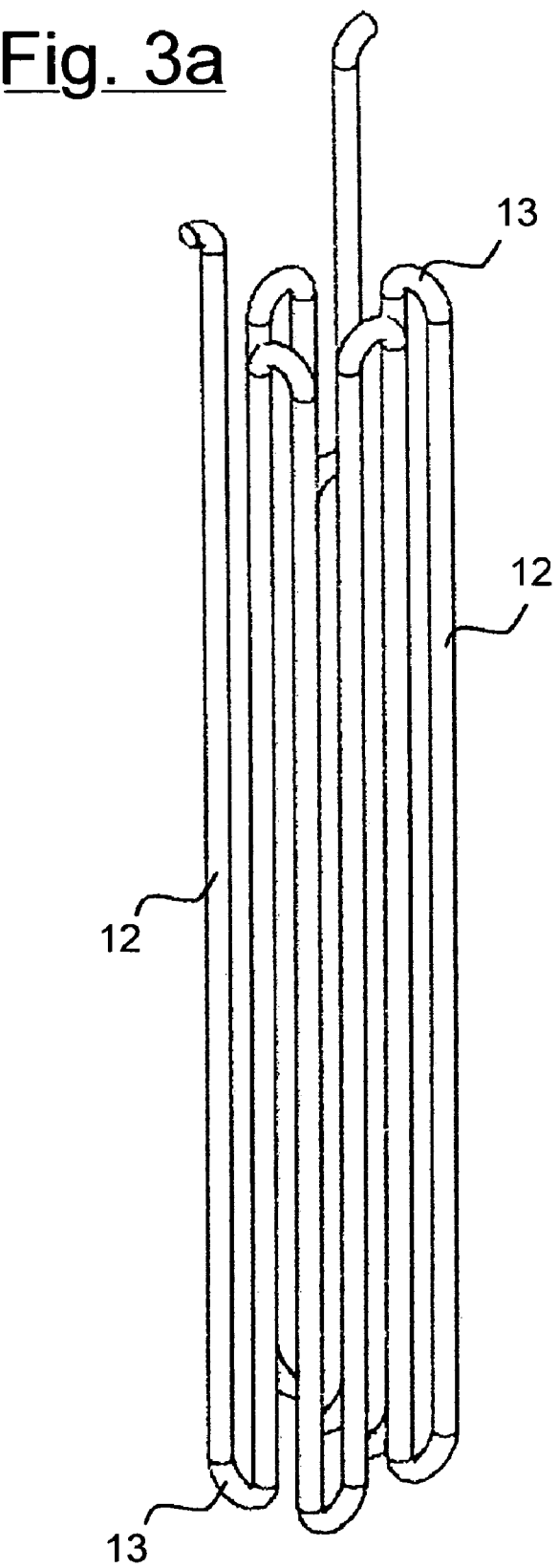
Figure 3B:
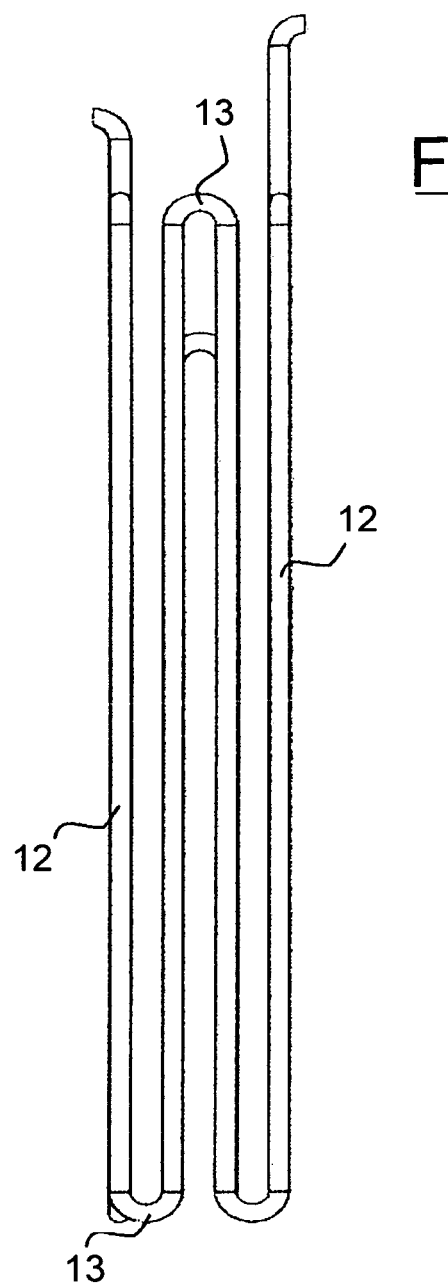
Figure 3C:
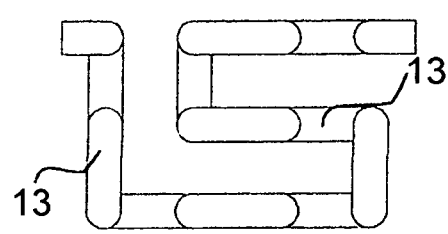

FIGS. 3a-3c respectively show a perspective view, a lateral/vertical view and a view from above of a generical tube bundle which is inserted in a thermal-exchange unit.

With reference to the Figures, the modular reactor (1) object of the present invention, comprises the cylindrical bodies (2) superimposed and fixed to each other by means of the flanges (3). The covering element (4) is welded or flanged at the head of the reactor, whereas the closing element (5) is welded or flanged at the bottom.

The discharge tubes (6) are envisaged in the covering element (4), for discharging reaction products in gas/vapour phase and possible non-reacted gases. Tubes for the feeding of the reagent gases (7) are envisaged in the closing elements (5), connected to the gas distributor (8), together with tubes for the recycling of the catalyst (9) coming from the filtration units.

As the modular reactor, object of the present invention, is used for chemical reactions which take place in three-phase systems (known as slurry) wherein a solid phase in finely subdivided form, dispersed in a continuous liquid phase, is maintained in suspension by a gas which passes through the same liquid phase in the form of bubbles, in its interior the composition of the reagent mass is substantially uniform. The collection of the reaction product, i.e. the slurry to be sent for filtration for the recovery of the dispersed catalyst, can therefore be effected in a generic position. In this example, the outlet (10) of the slurry is situated at about halfway of the total height of the reactor.

Figure 1:
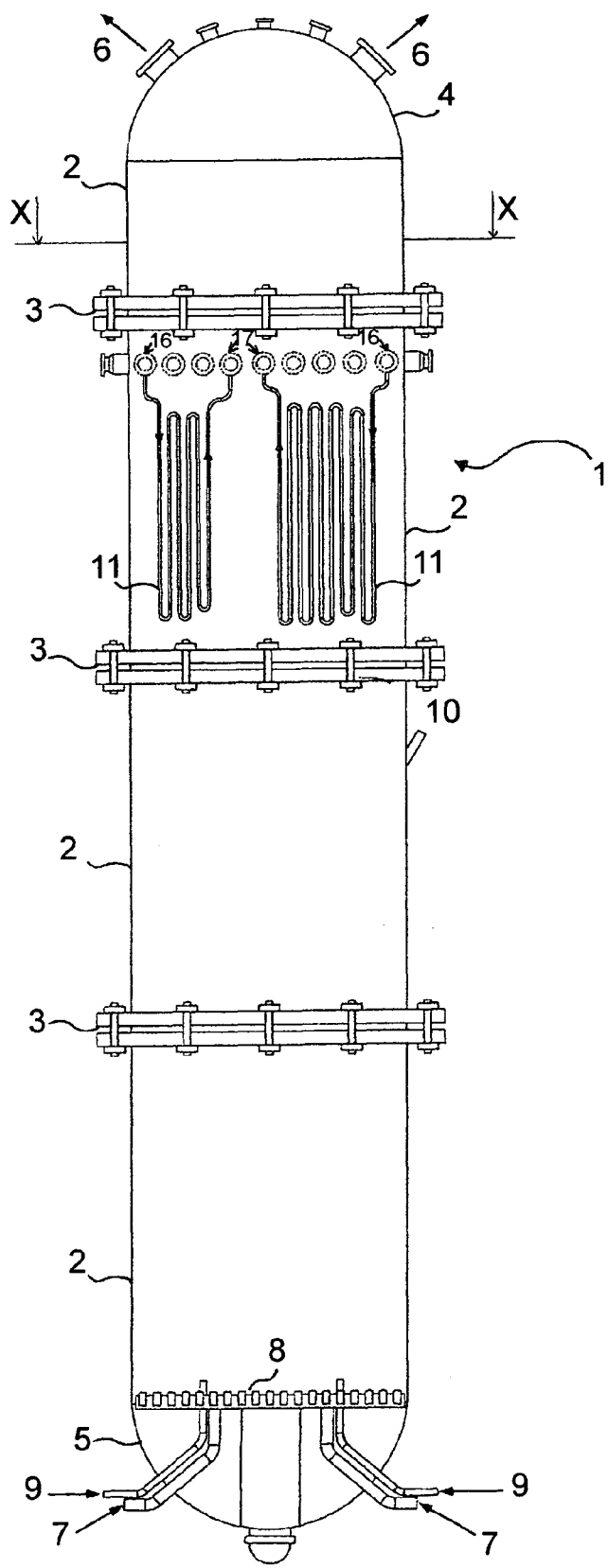
FIG. 1, represents a vertical sectional view of the reactor, object of the present invention.
Figure 2:
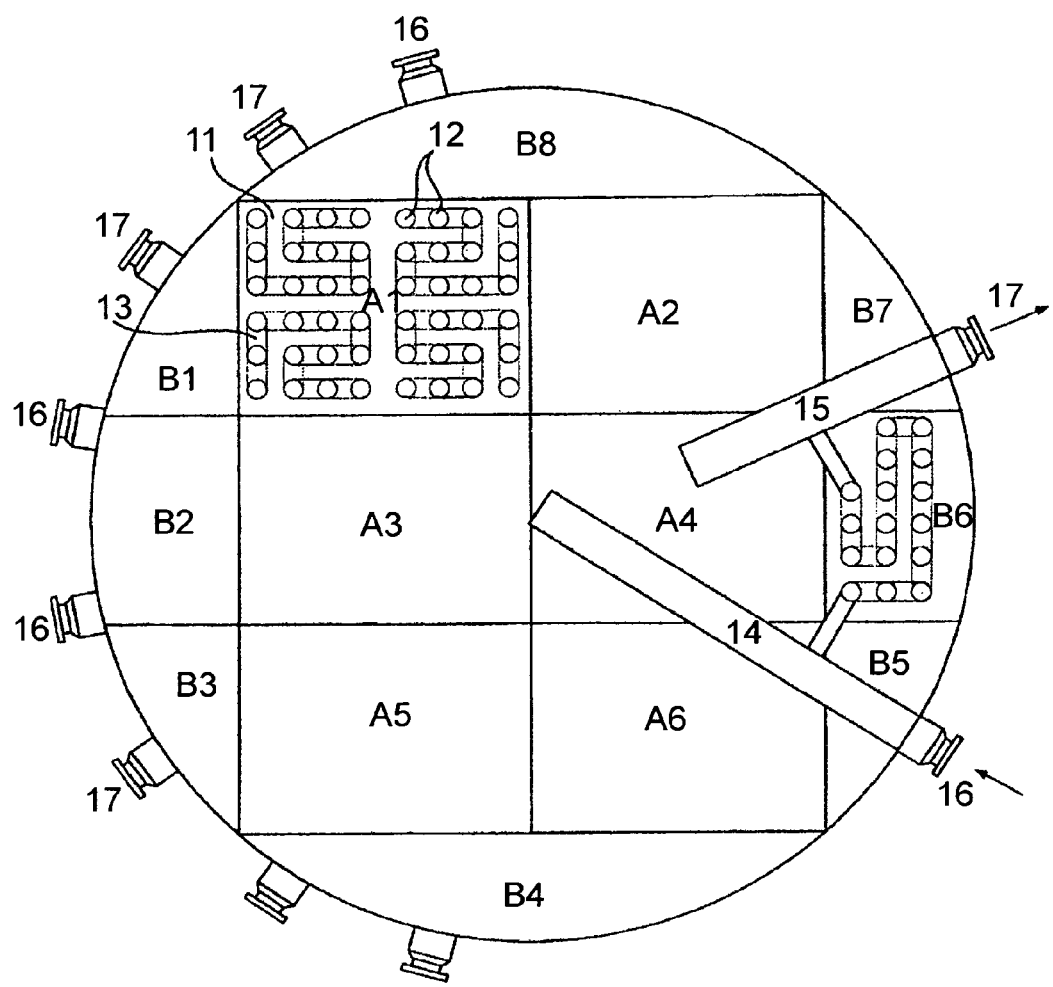
FIG. 2 is a transversal sectional view of FIG. 1 according to the direction X-X.

The thermal-exchange system (for the sake of simplicity, only the thermal-exchange system of a single cylindrical body, the upper one, is illustrated) is situated inside each cylindrical body. The thermal-exchange system comprises the central thermal-exchange units (A1-A6) and the side thermal-exchange units (B1-B8), each unit comprises a plurality of bundles (11) (also in this case, for the sake of simplicity, only four bundles in the unit Al and one bundle in the unit B6 are shown). Each bundle comprises a series of vertical tubes (12) connected in series with each other (according to the flow of the thermal-exchange fluid) by means of the U-type connectors (13). In FIG. 2, the dashed connectors are those situated at the base of the tubes, the connectors with a compact line are those situated in the upper part of the tubes.

The thermal-exchange system also includes distributing collectors (14) of the liquid for heat-exchange in the single bundles and collection collectors (15) of the same liquid at the outlet from the bundles.

The collectors are respectively connected to the inlet and outlet, respectively, of one or more bundles. For the sake of simplicity, also in this case, only two collectors are illustrated, one for each distribution and collection function.

Finally, in this example, each distribution and collection collector is connected to a corresponding inlet (16) and outlet (17) opening for the feeding and discharge of the thermal-exchange liquid to the outside.

The invention claimed is:

1. A modular reactor for exothermic/endothermic chemical reactions which take place in three-phase systems, wherein a solid phase in finely subdivided form is dispersed in a continuous liquid phase and is maintained in suspension by a gaseous phase which passes through the liquid phase in the form of bubbles, which comprises:
   a. a series of substantially cylindrical bodies which can be superimposed;
   b. a covering element positioned on a head of an upper body of the reactor;
   c. a closing element positioned at a base of a lower body of the reactor;
   d. a gas distributor, situated in correspondence with the base of the lower body, which substantially rests on the closing element and is connected to means for feeding a reagent gas;
   e. discharge tubes of the liquid reaction product, situated in correspondence with one or more of the cylindrical bodies;
   f. thermal-exchange devices, inserted in each cylindrical body and comprising a series of thermal-exchange units, each unit consisting of a series of bundles, each bundle consisting of a series of parallel, vertical tubes, connected in series, according to the flow of a heat-exchange fluid, above and below, one after another, by means of U-connectors;
   g. at least one distribution collector and at least one collector for the collection of the heat-exchange fluid, which flows in the tubes of the thermal-exchange units, having a tubular form and situated internally, on a horizontal plane, in the upper part or, alternatively, in the lower part of each cylindrical body; and
   h. at least one pair of openings situated externally and peripherically around an upper part or, alternatively, a lower part of each cylindrical body, one opening of said pair of openings being connected to the distribution collector and the other to the collection collector of the thermal-exchange fluid.

2. The modular reactor according to Claim 1, further comprising a number of cylindrical bodies varying from 2 to 10.

3. The modular reactor according to Claim 1 or 2, wherein each cylindrical body is made of carbon steel, corrosion-resistant steel or bound with metals selected from those of Groups 5-10.

4. The modular reactor according to Claim 1, wherein each cylindrical body has a height varying from 3 to 15 meters, a diameter which essentially ranges from 1.5 to 10 m and a thickness of the walls ranging from 40 to 200 mm.

5. The modular reactor according to Claim 1, wherein the cylindrical bodies are equipped with coupling flanges, upper and lower, with metallic gaskets which interact with each other, guaranteeing liquid and gas sealing.

6. The modular reactor according to Claim 1, wherein each cylindrical body comprises from 5 to 80 thermal-exchange units.

7. The modular reactor according to Claim 1, wherein each thermal-exchange unit comprises a series of tube bundles substantially vertical and parallel with each another, positioned vertically inside each thermal-exchange unit, in each cylindrical body, so as to occupy a volume ranging from 5 to 25% of the total volume of each cylindrical body.

8. The modular reactor according to Claim 1, wherein a specific thermal-exchange surface of the thermal-exchange units generally ranges from 4 to 40 $m^2/m^3$ of reagent medium (slurry) present in a cylindrical body.

9. The modular reactor according to Claim 1, wherein a number of bundles for each thermal-exchange unit varies from 1 to 9.

10. The modular reactor according to Claim 1, wherein each bundle consists of a number of tubes ranging from 5 to 30.

11. The modular reactor according to Claim 1, wherein the tubes of the bundles, having a diameter of 2 to 6 cm, have a varying length, with a maximum length substantially equal to that of a corresponding cylindrical body.

12. The modular reactor according to Claim 1, wherein from 2 to 60 distribution collectors are envisaged provided for the thermal-exchange fluid, inside each cylindrical body, at a base or at a top, for feeding the thermal-exchange fluid to the tubes of the bundles, and from 2 to 60 collection collectors are provided for collecting and conveying the return fluid from the thermal-exchange system towards the outside.

13. The modular reactor according to Claim 1, wherein, in order to favour the feeding and discharge operation of the thermal-exchange fluid, from 2 to 60 openings are provided for the distribution collector, and from 2 to 60 openings are provided for the collection collector, situated externally with respect to each cylindrical body, in correspondence with said collection and distribution collectors.

14. The modular reactor according to Claim 1, wherein the single bundles belonging to one or more thermal-exchange unit connected to the corresponding feeding and collection collectors, are distributed on the module section.

15. The modular reactor according to Claim 1, wherein the reactor is configured to produce substantially linear hydrocarbons, from synthesis gas $(CO+H_2)_2$ according to the Fischer-Tropsch reaction.

16. The modular reactor according to Claim 15, wherein the heat-exchange fluid is fed into the single modules and/or each thermal-exchange unit and/or bundles, through the corresponding collectors, with variable flow-rates.

* * * * *